United States Patent [19]

Ho

[11] Patent Number: 5,155,667
[45] Date of Patent: Oct. 13, 1992

[54] TELESCOPING WARNING LAMP DEVICE

[76] Inventor: Yih-Shin Ho, No. 221, Chung Shan Road, Sec. 2, Yung Ching Hsiang, Changhua, Taiwan

[21] Appl. No.: 751,973

[22] Filed: Aug. 29, 1991

[51] Int. Cl.⁵ ............................................. F21Y 21/06
[52] U.S. Cl. .................................. 362/190; 362/413; 362/414; 362/418
[58] Field of Search ............... 362/413, 414, 418, 431, 362/382, 183, 190, 285; 248/167; 340/468, 471, 473

[56] References Cited

U.S. PATENT DOCUMENTS

| | | | |
|---|---|---|---|
| 2,740,039 | 3/1956 | Phillips | 362/414 |
| 4,613,847 | 9/1986 | Scolari et al. | 340/114 |
| 4,870,543 | 9/1989 | Born et al. | 362/418 |
| 5,003,441 | 3/1991 | Crowe et al. | 362/183 |
| 5,010,454 | 4/1991 | Hopper | 362/183 |
| 5,012,394 | 4/1991 | Woodward | 362/413 |

FOREIGN PATENT DOCUMENTS 2100328  7/1971  Fed. Rep. of Germany ...... 248/167

*Primary Examiner*—Richard R. Cole
*Attorney, Agent, or Firm*—Bacon & Thomas

[57] ABSTRACT

A warning lamp device comprising a base having two U-shaped stands pivotably secured thereto at the bottom, a telescopic support fastened in the base at the top through a socket joint, and a warning lamp attached to the telescopic support at the top through a socket joint. The two U-shaped stands are arranged into a cross structure to firmly support the device in place against wind force and the telescopic support is extended out to heighten the position of the warning lamp. The telescopic support and the base are collapsed to reduce space occupation when not in use.

4 Claims, 2 Drawing Sheets

TELESCOPING WARNING LAMP DEVICE

BACKGROUND OF THE INVENTION

1. Field of the Invention

The present invention relates to a warning lamp device and relates more particularly to a built-up type of telescopic warning lamp device which is detachable to reduce space occupation when it is not in use.

2. Description of the Prior Art

During the construction or maintenance of a road, a warning sign or lamp must be set up at a suitable location to warn people of danger. When a motor vehicle is out of order, it must be stopped at a road side and then a warning sign or lamp must be set up at a distance of 50 to 100 meters behind the motor vehicle in trouble. Regular warning signs are generally made in a triangular structure that is not adjustable or detachable. If a warning sign is tall enough to warn people or car drivers at distance of a danger, the warning sign will be difficult to carry and will occupy much space for storage. If a warning sign is compact for easy carry, the warning sign may be unable to warn the people or car drivers at a distance. The present invention is designed to provide a warning lamp device which can be used to replace regular warning signs, which does not occupy much space when it is not in use, and more important, which can be adjusted to a desired height so that its visual warning signal can be clearly seen by people at distance.

SUMMARY OF THE INVENTION

The present invention has been accomplished under the circumstances in view. It is therefore an object of the present invention to provide a built-up type of telescopic warning lamp device which can be conveniently collapsed to make carrying easy and to reduce space occupation when it is not in use.

It is another object of the present invention to provide a built-up type of telescopic warning lamp device which can conveniently set up into shape and adjusted into a desired height.

It is still another object of the present invention to provide a built-up type of telescopic warning lamp device which has means to firmly support the structure in position against wind force, and can be conveniently collapsed to reduce space occupation when it is not in use.

To acheive the above objects, there is provided a built-up type of telescopic warning lamp device according to the present invention, which is generally comprised of a base, a telescopic support fastened in said base at the top, a lamp housing attached to said telescopic support at the top to hold a warning lamp, and an electric power supply unit connected to said lamp housing to drive said warning lamp to produce a visual warning signal. The base comprises a body having two substantially U-shaped stands pivotably attached thereto at the bottom and can be conveniently arranged into a cross structure to firmly support the whole assembly of the warning lamp device or arranged into a longitudinally overlapped structure to reduce space occupation when the warning lamp device not in use. The telescopic support is consists of a series of tubes that slide one inside another. The series of tubes includes a top tube at the top fastened in the bottom of a lamp housing through socket joint, a bottom tube at the bottom fastened in the top of the base through socket joint, and at least one intermediate tube at the middle. The top tube and the at least one intermediate tube each have two blind holes at two opposite locations with two balls fastened therein and supported by spring means to releasably engage in an annular groove formed on the inner wall surface on the bottom tube and each of the at least one intermediate tube adjacent to the top edge thereof. The telescopic support can be adjusted to support the lamp housing at a desired height. The bottom tube of the telescopic support has a battery chamber for holding the electric power supply unit. The electric power supply unit can be a regular AC or DC power supply or comprised of a rechargeable battery set.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
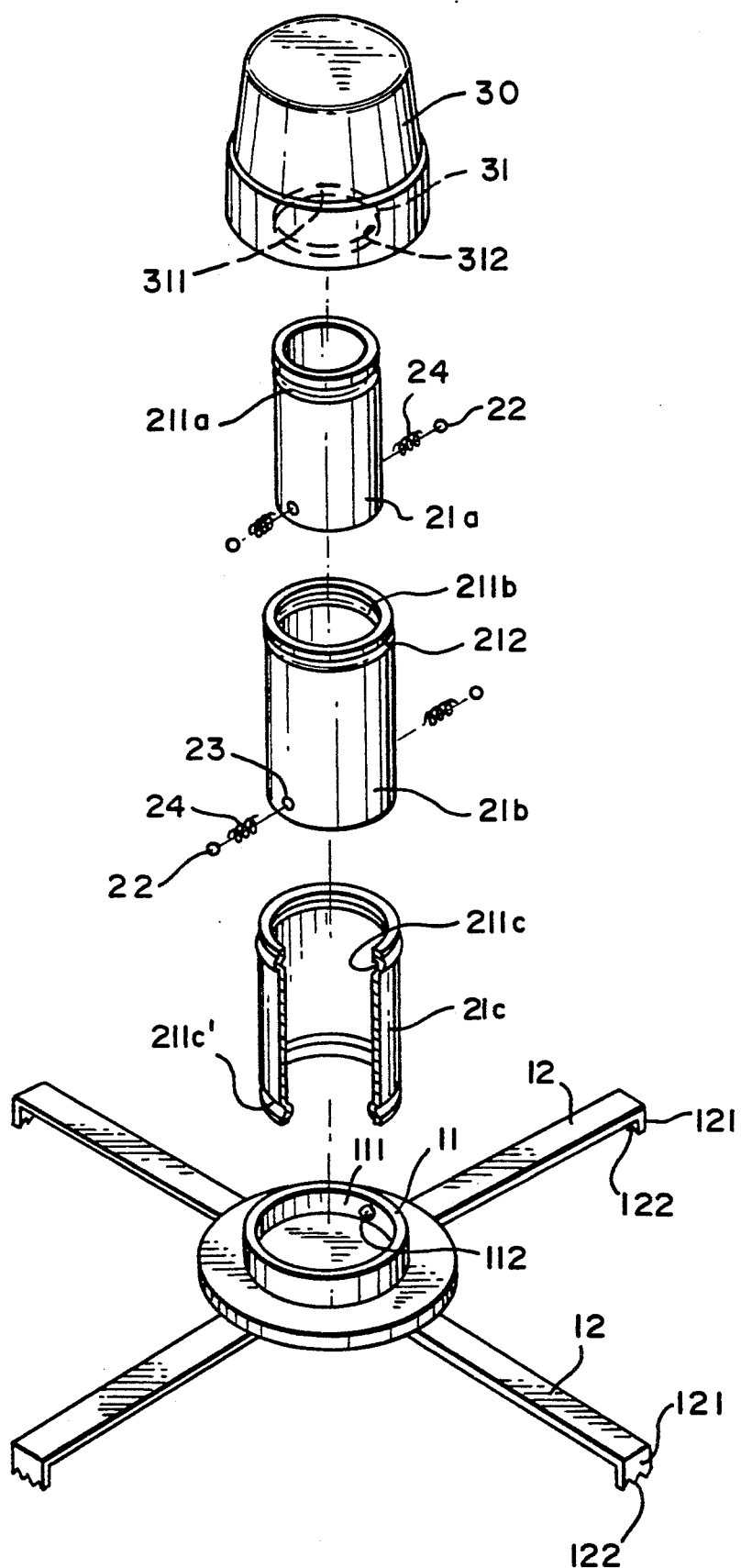
FIG. 1 is an exploded perspective view of the preferred embodiment of the built-up type of telescopic warning lamp device of the present invention.

Referring to the annexed drawings in detail, therein illustrated is the preferred embodiment of the built-up type of telescopic warning lamp device of the present invention. The device is generally comprised of a base 10, a telescopic support 20 and a warning lamp 30.

The body of the base 10 is made from a plastic material through the processing of molding, having a unitary, annular flange 11 upstanding from the top edge thereof, which annular flange 11 has two ball-like raised portions 112 symmetrically projecting from the inner wall surface 111 thereof. There are provided two stands 12 pivotably attached to the base 10 at the bottom, which stands 12 are each made from a metal bar having a center part pivoted to the base 10 and two opposite ends 121 respectively bent inwardly at right angles. The end edge 122 of either end 121 of either stand 12 is a series of teeth by which the stands 12 can be firmly positioned in place. Because the two stands 12 are pivotally secured to the base 10 at the bottom, they can be arranged into a cross structure to support the telescopic support 20 and the warning lamp 30 or overlapped together to reduce space occupation when the warning lamp device is not in use.

Figure 2:
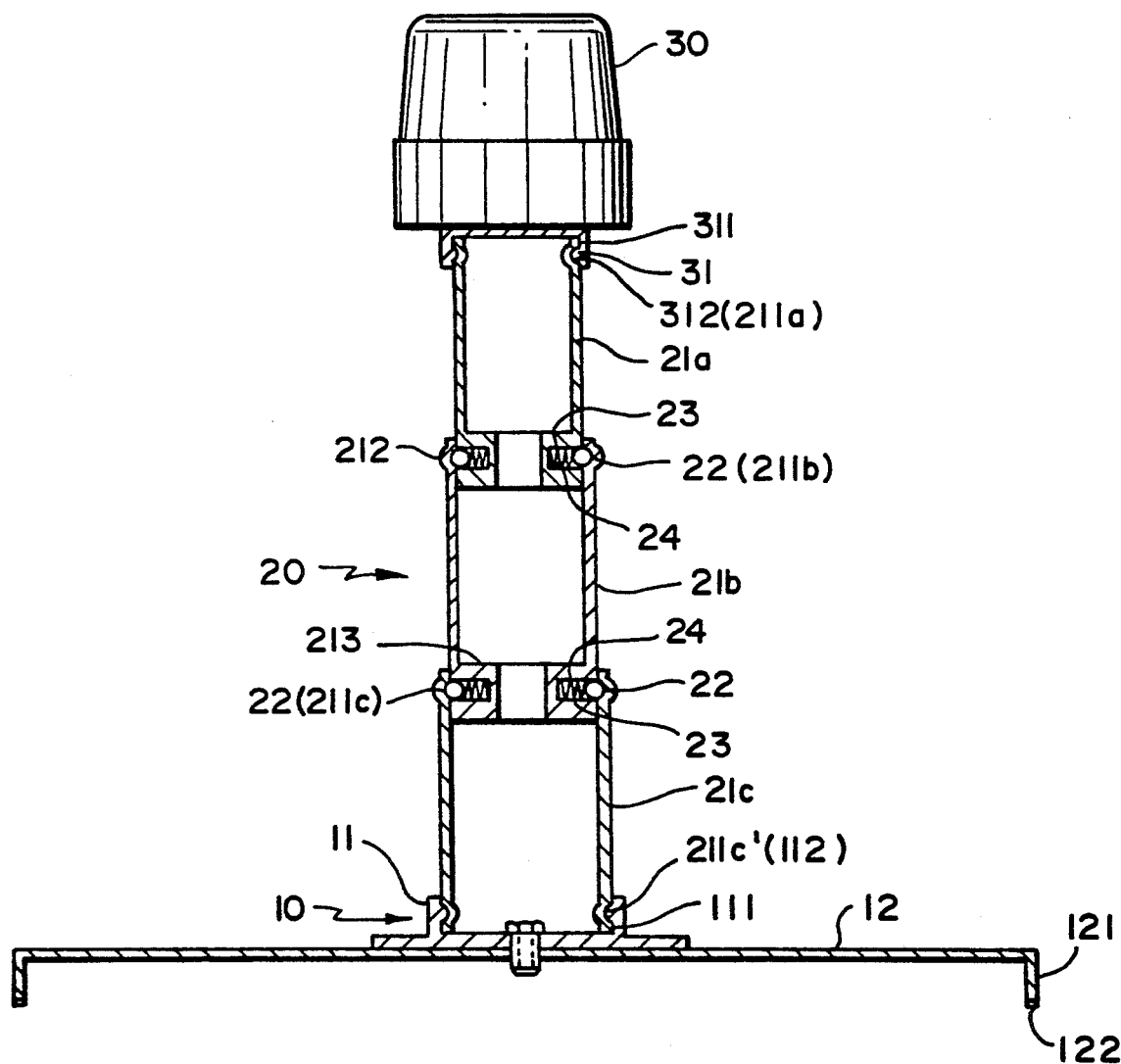
FIG. 2 a sectional view thereof taken in longitudinal direction.

The telescopic support 20 is fastened in the annular flange 11 of the base 10 to support the warning lamp 30. It consists of a series of tubes made from a rigid plastic material that slide one inside another. In the present preferred embodiment, the telescopic support 20 consists of three tubes, namely, a top tube 21a which is the smallest one disposed at the top, a bottom tube 21c which is the largest one disposed at the bottom, and an intermediate tube 21b which is retained between said top tube 21a and said bottom tube 21c. The bottom tube 21c has a first annular groove 211c formed on the inner wall surface adjacent to the top edge thereof and a second annular groove 211c' formed on the outer wall surface adjacent to the bottom edge thereof. The intermediate tube has an annular groove 211b formed on the inner wall surface adjacent to the top edge thereof and an annular projection 212 formed on the outer wall surface adjacent to the top edge thereof opposite to annular groove 211b. The annular porjection 212 is of such an outer diameter that the intermediate tube 21b is prevented from completely falling inside the bottom tube 21c. The intermediate tube 21b further has two blind holes 23 transversely made formed on a unitary annular projection 213, which projects from the inner wall thereof at the bottom (see FIG. 2), at two opposite locations. Inside each blind hole 23, there is fastened a spring 24 to support a ball 22. The top tube 21a has also two springs 24 and two balls 22 fastened therein at two opposite locations adjacent to the bottom edge thereof, and an annular groove 211a around the outer wall surface adjacent to the top edge thereof.

The warning lamp 30 has an annular flange 31 projecting from the bottom edge of the casing thereof, which annular flange 31 has two ball-like projections 312 raised from the inner wall surface 311 thereof and disposed at two opposite locations. Regular AC/DC power supply may be alternatively connected to the warning lamp 30 to turn on the lamp bulb fastened therein. Rechargeable battery power supply is also an alternate choice. When battery power supply is used, it can be set inside the bottom tube 21c which is designed to have a battery chamber defined therein.

The aforesaid parts can be conveniently set up into shape. After the top tube 21a is inserted in the intermediate tube 21b, the intermediate tube 21b as well as the top tube 21a are inserted in the bottom tube 21c forming into a telescopic support 20. Once the two stands 12 are pivotably attached to the base 10 at the bottom, the bottom tube 21c is fastened in the annular flange 11 at the top the base 10 permitting the two ball-like raised portions 112 of the annular flange 11 to engage in the second annular groove 211c' of the bottom tube 21c. Thus, the telescopic support 20 is fastened in the base 10 at the top. Then, the top tube 21a is inserted in the annular flange 31 of the warning lamp 30, permitting the two ball-like raised portions 312 on the annular flange 31 of the warning lamp 30 to respectively engage in the annular groove 211a on the outer wall surface of the top tube 21a. When in use, the top tube 21a is pulled upwardly from the intermediate tube 21b permit the two balls 22 in the top tube 21a to respectively engage in the annular groove 211b on the intermediate tube 21b and thereafter, the intermediate tube 21b is pulled upwardly from the bottom tube 21c permitting the two balls 22 in the intermediate tube 21b to respectively engage in the first annular groove 211c on the bottom tube 21c. Then, the two stands 12 are arranged into a cross structure to firmly support the base 10, the telescopic support 20 and the warning lamp 30 in place. By adjusting the total length of the telescopic support 20, the height of the warning lamp 30 on the warning lamp device is adjusted. Once the power supply is connected to the lamp bulb in the warning lamp 30, the device produces a visual warning signal to the people coming from all directions. Because of the design of the base 10, the warning lamp device can be stably placed on the ground against wind force.

When not in use, the warning lamp 30, the telescopic support 20 and the base 10 are respectively detached from one another and then received in a portable box to minimize space occupation. Without detaching from one another, the total size of the warning lamp device can be greatly reduced by setting the tubes 21a, 21b and 21c inside one another and gathering up the two stands 12 into a longitudinally overlapped condition.

As indicated, the present invention is to provide a built-up type of telescopic warning lamp device which provides numerous advantages as follows:

1) The whole assembly can be conveniently collapsed or detached into parts to facilitate transport and storage.

2) It can be used in road maintenance and construction to replace regular warning signs.

3) It is light and rustproof and can be firmly retained in place at four angles and is stable under strong wind force.

I claim:

1. A telescoping warning lamp device comprising:
a) a base, a telescopic support secured to the base, and a lamp housing secured to the telescopic support for containing a warning lamp;
b) the telescopic support including a plurality of tubes sized for slidable nesting one inside the other, the tubes including a top tube, a bottom tube and at least one intermediate tube, the top tube including a top end secured to the lamp housing through a socket joint, the bottom tube including a bottom end secured to the base through a socket joint, the top tube and at least one intermediate tube each having two opposed blind holes with each blind hole being provided with a spring releasable ball therein, an annular groove formed on an inner wall of each of the bottom tube and intermediate tubes, and the balls of the top tube being releaseably engageable within the annular groove of the intermediate tube and the balls of the intermediate tube being releasably engageable within the annular groove of the bottom tube;
c) the base comprises a body including two substantially U-shaped stands pivotably attached to a bottom of the base and disposable in a first cross structure configuration for supporting the body in a position of use and in a second longitudinally overlapped structure for storage, an annular flange extending upwardly from a top edge of the body, two opposed ball-shaped portions extending inwardly from an inner wall of the annular flange, an annular groove formed around an outer wall of the bottom tube, and the ball-shaped portions being engaged within the annular groove; and
d) the lamp housing including a circular flange projecting from a bottom edge thereof, the circular flange including two opposed ball-shaped portions extending inwardly from an inner wall thereof, an annular groove formed around an outer wall of the top tube, and the ball-shaped portions being engaged within the annular groove.

2. The telescopic warning lamp of claim 1 wherein the body and the lamp housing are each formed from plastic material.

3. The telescopic warning lamp of claim 1 wherein the plastic tubes are each formed from a plastic material.

4. The telescopic warning lamp of claim 1 wherein the bottom tube includes a chamber formed therein for containing an electric power supply unit.

* * * * *